(12) United States Patent
Inoue et al.

(10) Patent No.: US 6,935,646 B2
(45) Date of Patent: Aug. 30, 2005

(54) TORSION BEAM SUSPENSION

(75) Inventors: Mitsuru Inoue, Tochigi (JP); Kiyoshi Horiuchi, Tochigi (JP)

(73) Assignee: F. Tech Incorporation, Saitama (JP)

( * ) Notice: Subject to any disclaimer, the term of this patent is extended or adjusted under 35 U.S.C. 154(b) by 56 days.

(21) Appl. No.: 10/313,952

(22) Filed: Dec. 6, 2002

(65) Prior Publication Data

US 2004/0007846 A1 Jan. 15, 2004

(30) Foreign Application Priority Data

Jul. 9, 2002 (JP) ........................................ 2002-199449

(51) Int. Cl.$^7$ ............................ B60G 3/14; B60G 21/05
(52) U.S. Cl. ........................ 280/124.106; 280/124.116; 280/124.128; 280/124.166; 301/132
(58) Field of Search .................... 280/124.106, 124.107, 280/124.116, 124.128, 124.13, 124.132, 124.165, 124.66; 29/897.2; 301/125, 132

(56) References Cited

U.S. PATENT DOCUMENTS 4,165,098 A * 8/1979 Wagner ............... 280/124.116
5,507,518 A * 4/1996 Nakahara et al. ..... 280/124.166
6,059,314 A * 5/2000 Streubel et al. ....... 280/124.153
6,152,468 A * 11/2000 Glaser et al. ......... 280/124.134

FOREIGN PATENT DOCUMENTS

| JP | 08-253010 | 10/1996 |
|---|---|---|
| JP | 2000-094917 | 4/2000 |
| JP | 2001-113925 | 4/2001 |

* cited by examiner

Primary Examiner—Peter C. English
(74) Attorney, Agent, or Firm—Carrier, Blackman & Associates, P.C.; Joseph P. Carrier; William D. Blackman

(57) ABSTRACT

Opposite ends of a torsion beam are connected to left and right trailing arms, and a spindle which supports a wheel is secured to a spindle support plate which is welded to each of the left and right trailing arms. Bent flanges which are formed in the outer periphery of a body of the spindle support plate, are fitted to the outer periphery of the end of trailing arm and secured by welding. With this arrangement, thermal warp of the body of the spindle support plate which supports spindle can be prevented, and not only can the mounting precision of the spindle be improved, but also the thickness of the spindle support plate can be reduced to reduce the weight.

7 Claims, 5 Drawing Sheets

TORSION BEAM SUSPENSION

BACKGROUND OF THE INVENTION

1. Field of the Invention

The present invention relates to a torsion beam suspension comprising: vertically pivotable left and right trailing arms extending in a longitudinal direction of a vehicle body; a torsion beam extending in a lateral direction of the vehicle body, the opposite ends of which are connected to the left and right trailing arms; a spindle support plate welded to each of the left and right trailing arms; and a spindle fixed to the spindle support plate so as to axially support a wheel.

2. Description of the Related Art

A conventional torsion beam suspension is known from Japanese Patent Application Laid-open No. 2000-94917.

In the conventional torsion beam suspension, a trailing arm is a hollow member made by combining and integrally welding press-formed upper and lower plates, and a bracket formed from an angular U-shaped metal plate is welded to the trailing arm to secure a spindle support plate which supports a wheel.

However, the above-mentioned conventional design has a problem in that the spindle axle line and the trailing arm major cross-section are largely offset with the angular U-shaped bracket disposed therebetween, so that the bracket must have a wall thick enough to reliably support a load from the wheel, resulting in an increased weight.

Therefore, it is conceivable that the angular U-shaped bracket ii eliminated, a spindle support plate is welded to an end of the trailing arm, and the spindle is fixed with bolt to the spindle support plate through a mounting flange integral with the spindle. In doing so, not only is the weight reduced by eliminating the heavy bracket, but it also becomes possible to bring the spindle axle line and the trailing arm major cross-section closer to each other, resulting in an advantageous strength.

However, in reality, when the trailing arm end is welded to the spindle support plate, the spindle mounting surface of the spindle support plate may be warped by the heat of welding. In order to prevent this thermal warping, it is necessary to make the spindle support plate sufficiently thick (for instance, over 10 mm), so that the total thickness of the spindle support plate and the mounting flange (for instance, 10 mm thick) integral with the spindle which is connected to the spindle support plate, becomes over 20 mm, disadvantageously resulting in no reduction in weight. Moreover, there is also a problem that welding property is deteriorated due to a large difference in thickness of the trailing arm having a small wall thickness and the spindle support plate having a large wall thickness.

In order to solve the problems of thermal warp and weight, the spindle support plate can be machined to be flat and thinner after welding the spindle support plate to the trailing arm end. However, in this case, because the spindle axle line is the reference for the surface cut, it is necessary to rotate the whole trailing arm in conducting the surface cut, so that machining becomes very complicated and costly.

It is also conceivable to eliminate the spindle support plate, and weld the spindle-mounting flange assembly directly to the trailing arm, but it is still necessary that the mounting flange thickness be for instance 13 mm or more, in order to solve the problem of thermal warp. Therefore, a weight increase is unavoidable.

Accordingly, an object of the present invention is to reduce weight by reducing the wall thickness of the spindle support plate which is directly welded to the end of the trailing arm, and to effectively prevent thermal warp which accompanies welding.

In order to achieve the above object, according to a first feature of the invention, a torsion beam suspension comprising: vertically pivotable left and right trailing arms extending in a longitudinal direction of a vehicle body; a torsion beam extending in a lateral direction of the vehicle body, the opposite ends of which are connected to the left and right trailing arms; a spindle support plate welded to each of the left and right trailing arms; and a spindle fixed to the spindle support plate so as to axially support a wheel, wherein a bent flange is formed around an outer periphery of a body of the spindle support plate and is fitted around an outer periphery of an end of the trailing arm, the bent flange being welded to the trailing arm.

With this arrangement, because the bent flange is formed around the outer periphery of the body of the spindle support plate and is fitted around the outer periphery of the end of the trailing arm, the bent flange being welded to the trailing arm, the heat from welding is blocked by the bent flange of the spindle support plate, to thereby prevent the heat from reaching the body. Therefore, thermal warp of the body of the spindle support plate which retains the spindle is prevented, and not only can the spindle mounting precision be improved without cutting the spindle support plate surface, but the support plate thickness can be reduced to reduce the weight. Moreover, welding property is improved because the difference in wall thickness compared with the trailing arm is reduced.

According to a second feature of the invention, in addition to the arrangement of the first feature, a spindle support hole is formed in the body of the spindle support plate by burring, and the spindle is press-fitted into the spindle support hole.

With this arrangement, the spindle support hole can be formed in the spindle support plate by burring because the spindle support plate is made thinner. As a result, the spindle can be retained by press-fitting it into the burring-formed spindle support hole without forming a spindle-mounting flange assembly to retain the spindle support plate, that is, the spindle weight can be reduced by the weight of the eliminated mounting flange.

Furthermore, according to a third feature of the invention, in addition to the arrangement of the second feature, a tip end of the spindle press-fitted into the spindle support hole passes through the trailing arm and projects out of the trailing arm, a projecting portion of the spindle being welded to the trailing arm.

With this arrangement, the tip end of the press-fitted spindle passes through and projects out of the trailing arm before being welded to the trailing arm to firmly connect the spindle to the trailing arm, whereby the heat of welding does not affect the spindle support plate.

DETAILED DESCRIPTION OF THE PREFERRED EMBODIMENT

The present invention will be described with reference to a preferred embodiment shown in the attached drawings.

Figure 1:
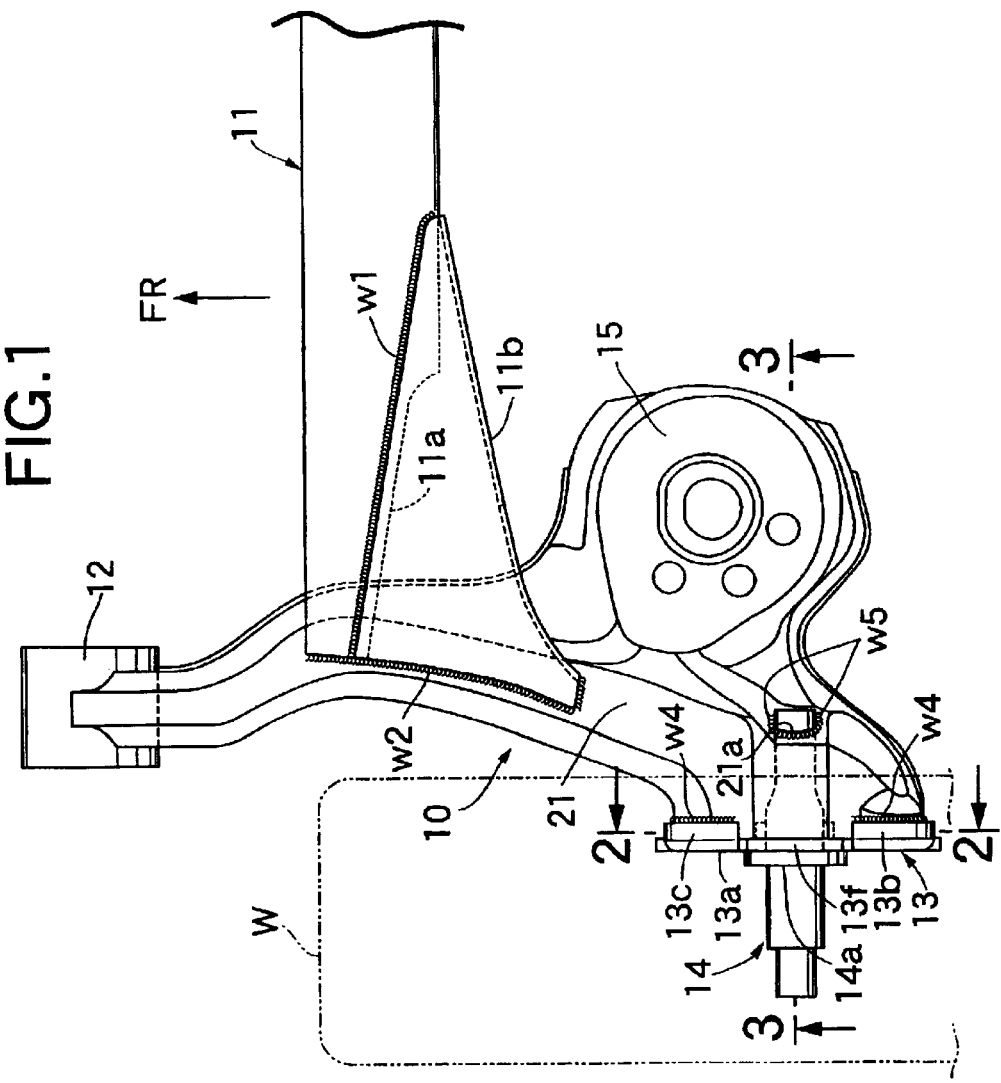
FIG. 1 is a front plan view of the left half of a torsion beam suspension.
Figure 2:
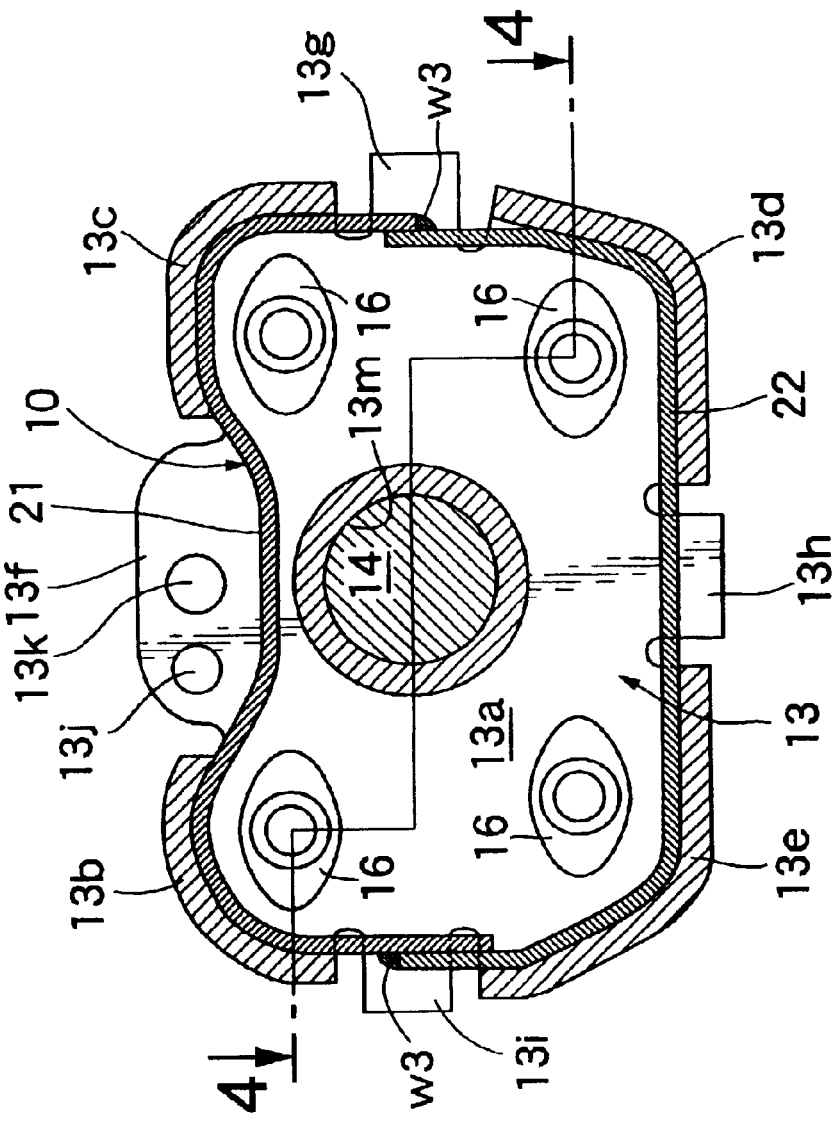
FIG. 2 is an enlarged cross-sectional view taken along line 2—2 in FIG. 1 and alone line 2—2 in FIG. 4.
Figure 3:
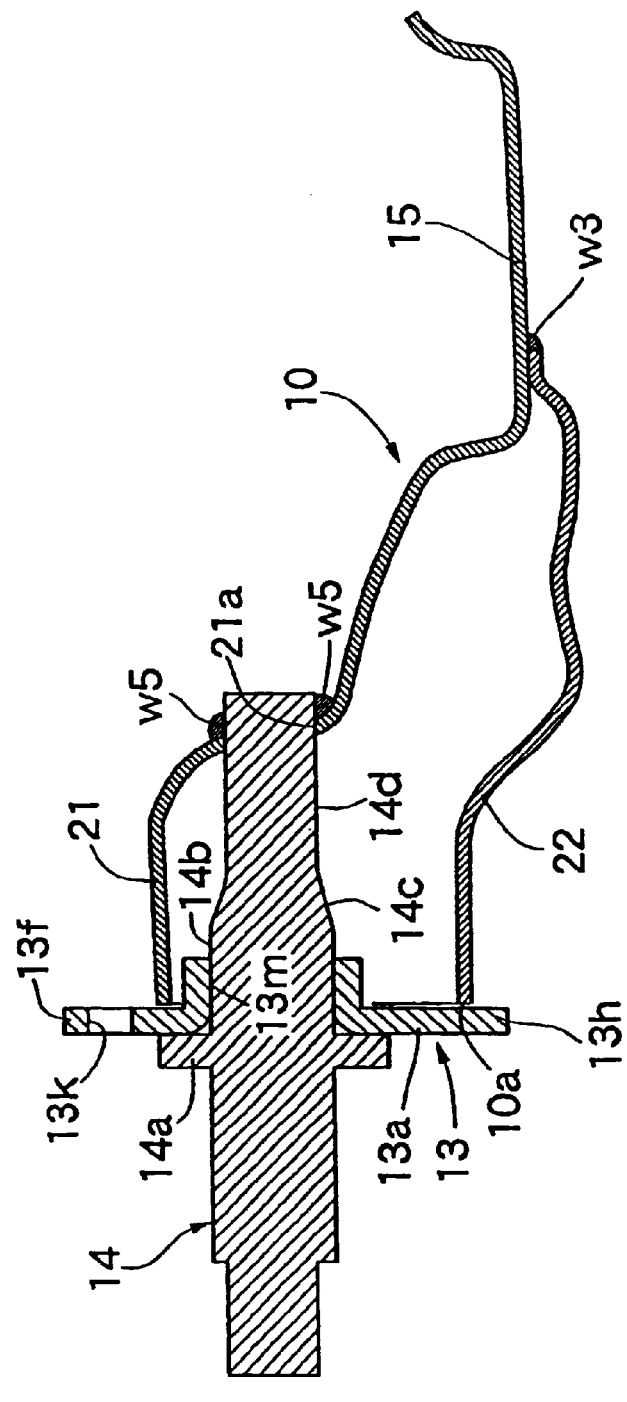
FIG. 3 is a cross-sectional view taken along line 3—3 in FIG. 1.

FIG. 1 is a front plan view of the left half of a torsion beam suspension for rear wheels of an automobile, and the right half of the torsion beam suspension has a construction symmetrical with that of left half with respect to the longitudinal centerline of the vehicle. The torsion beam suspension has left and right trailing arms 10, 10 which extend in the longitudinal direction of a vehicle body, and torsion beam 11 which extends in the lateral direction of the vehicle body to link to the left and right trailing aims 10, 10. The front end of the trailing arm 10 is welded to a tubular trailing arm support 12. The trailing arm 10 is vertically pivolably supported on the vehicle body via a rubber bushing joint (not shown) accommodated in the trailing arm support 12. A rear wheel W is rotatably supported on the spindle 14 fixed to the spindle support plate 13 which is welded to the outer end of a rear portion of the trailing arm 10. Also, the inner end of the rear portion of the trailing arm 10 has washer 15 which support the bottom end of a suspension spring.

The torsion beam 11 has an angular U-shaped cross-sectional which opens towards the front of the vehicle body. A gusset 11b is welded by welding w1 such that it covers notch 11a formed in the rear side edge of the end of the torsion beam. The edge of torsion beam 11 including gusset 11b is fitted to and welded by welding w2 to the vertical surface of the trailing arm 10.

The trailing arm 10 is a hollow integral member constructed with an upper half 21 and a lower half 22, connected by welding w3, which are press-formed from metal plates, and a spring washer 15 is provided in the upper half 21. The end face 10a of the trailing arm 10 to which the spindle support plate 13 is secured.

The spindle support plate 13 is a substantially rectangular plate member, four bent flanges 13b–13e are integrally formed with the plate at the four corners of the flat body 13a, and clamp sections 13f–13i are formed to project vertically and laterally. As shown, the bent flanges 13b–13e extend around adjacent edges of the support plate 13 at the corners thereof. The four bent flanges 13b–13e of the spindle support plate 13 are fitted to the outer periphery of the end of the trailing arm 10, and are welded w4 to the outer periphery of the end of trailing arm 10. At that time, the four clamps 13f–13i are clamped in order to determine the position of the spindle support plate 13 with regard to the trailing arm 10, and welded in this condition, so that welding precision can be improved. In particular, bent flanges 13b–13e are provided at the four corners of spindle support plate 13, resulting in an effective positioning of the spindle support plate 13 with regard to the trailing arm 10.

Figure 4:
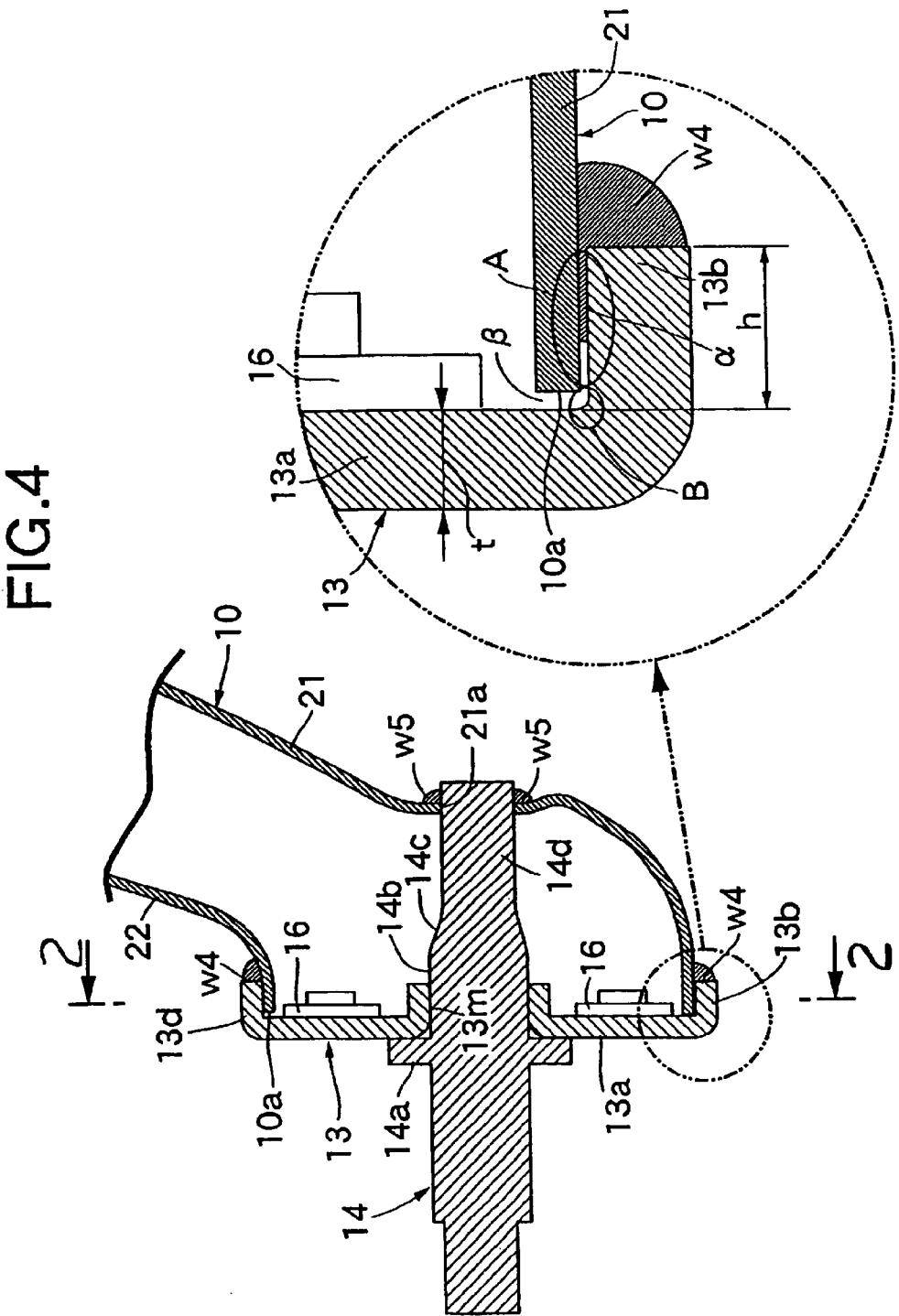
FIG. 4 is a cross-sectional view taken along line 4—4 in FIG. 2.
Figure 5:
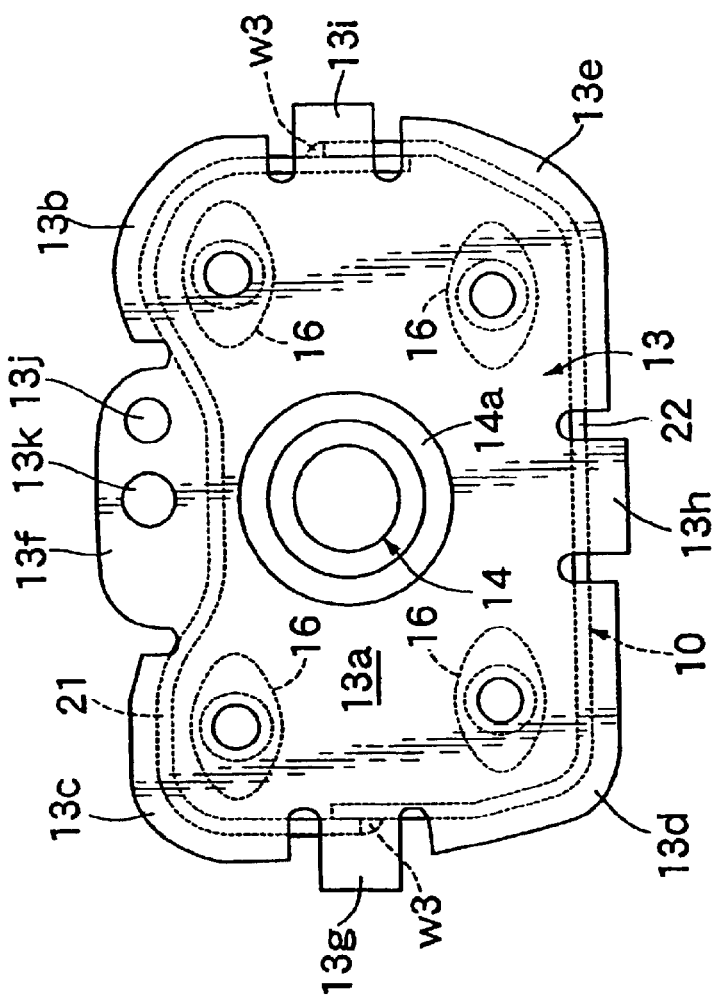
FIG. 5 is a view taken from arrow 5 in FIG. 3.

As is enlarged in the circle in FIG. 4, the outer periphery of the end of the trailing arm 10 and the inner surfaces of the bent flanges 13b–13e of the spindle support plate 13 are parallel with each other in section A where they overlap, forming a small gap α. The projection height h of the bent flanges 13b–13e is not more than twice the thickness t of the wall thickness of the spindle support plate 13 (h≦2t), so that the shapes of the bent flanges of 13b–13e are secured to be stable and parallel within the region, and at the same time, the bonding rigidity can be ensured by welding w4 at the vicinity of each corner. Each bent section B of the inner surfaces of the bent flanges 13b–13e is made to have an extremely small curvature radius (<1 mm), and there is a small gap β between the end surface 10a of the trailing arm 10 and the inner surface of spindle support plate 13.

In this manner, the mounting angle of the spindle support plate 13 can be adjusted freely to some extent with regard to the trailing arm 10, and the positioning of the spindle support plate 13 in welding the spindle support plate 13 to the trailing arm 10 is facilitated, whereby the welding precision can be further improved.

Four weld nuts 16 are secured on the inner surface of the spindle support plate 13, and a back plate of a braking device (not shown) which is mounted to the outer surface of the spindle support plate 13 is secured by tightening bolts into these weld nuts 16. Two holes 13j, 13k are formed in the upper clamp 13j in order to mount ABS equipment.

A spindle support hole 13m is burring-formed in the center of the body 13a of the spindle support plate 13. The spindle 14 has a large diameter section 14b leading to an annular projection 14a formed in the longitudinal center, a taper section 14c and a small radius section 14d. As shown the support hole 13m has a projecting edge, lip or burrs, which extend in an axial direction of the support hole beyond the thickness of the flat body 13a and engage against the spindle large diameter section 14b. The spindle support hole 13m is enlarged by the taper section 14c and the large diameter section 14b is press-fitted into the spindle support hole 13m, and in the end, the projection 14a abuts against the body 13a of the spindle support plate 13. At this time, the small diameter section 14d at the end of spindle 14a passes through within and projects out of the opening 21a formed in the upper half 21 of the trailing arm 10, and is secured by welding w5.

As described above, the bent flanges 13b–13e are formed in the outer periphery of the spindle support plate 13, and these bent flanges 13b–13e are fitted and welded to the outer periphery of the end of trailing arm 10, so that even if the wall thickness of the spindle support plate 13 is reduced from the conventional 10 mm or more to around 5 mm to 7 mm in order to reduce the weight, the body 13a of the spindle support plate 13 can be prevented from warping due to the heat from welding w4. Therefore, it is unnecessary to perform machining on the surface 13a of the spindle support plate 13 after welding w4 is done in order to eliminate the effects of warping, which contributes to a reduction in the processing costs. Furthermore, by reducing the wall thickness of the spindle support plate 13, the difference in thickness between the spindle support plate 13 and the trailing arm 10 is decreased, whereby degradation of welding property can be prevented.

Also, because the spindle support plate 13 is directly connected to the end of the trailing arm 10 without use of a bracket, the offset between the axle line of the spindle 14 and the major cross-section of the trailing arm 10 is reduced, and the rigidity of the trailing arm 10 and spindle 14 assembly is enhanced.

By reducing the wall thickness of the spindle support plate 13, it becomes possible to form the spindle support hole 13m in the spindle support plate 13 by burring. This is because if the spindle support plate 13 is too thick, the material expansion rate becomes too large during the burring, thereby easily generating cracks. Therefore, it becomes possible to retain the spindle 14 by press-fitting it into the spindle support hole 13m which has been formed by burning in the spindle support plate 13 without providing a mounting flange to the spindle 14. That is, a mounting flange can be eliminated from the spindle 14 contributing to a reduction in weight.

Also, because the tip end of the spindle 14 which is press-fitted into the spindle support hole 13m, is then passed through the opening 21a into and out of the trailing arm 10, and welded by welding w5 into place, mounting rigidity of the spindle 14 and the trailing arm 10 with regard to the spindle support plate 13 can be dramatically enhanced, which can contribute to increases in camber rigidity and suspension toe rigidity. The weld site w5 is sufficiently distanced from the spindle support plate 13, so that there is no possibility that the heat from welding causes thermal warping of the spindle support plate 13.

The preferred embodiment of the present invention has been described in detail above, but various modifications in design may be made thereto without deviating from the scope and spirit of the present invention.

For instance, in the preferred embodiment, the four bent flanges 13b–13e are formed at the four corners of the spindle support plate 13, but a single bent flange may be formed around the whole outer periphery of the spindle support plate 13 and the number other than four of bent flanges may be formed. Also, the bonding strength can be further increased if the tip end of the spindle support hole 13m and the large diameter section 14b of the spindle 14 are welded together.

What is claimed is:

1. A torsion beam suspension comprising:
   vertically pivotable left and right trailing arms extending substantially in a longitudinal direction of a vehicle body;
   a torsion beam extending in a lateral direction of the vehicle body, the opposite ends of which are connected to the left and right trailing arms;
   a substantially flat spindle support plate welded to each of the left and right trailing arms in abutting relation to end faces of the trauma arms, respectively; and
   a spindle fixed to each of the spindle support plates to axially support a wheel,
   wherein a bent flange is formed around an outer periphery of a body of each of the spindle support plates and is fitted around an outer periphery of an end of a corresponding one of the trailing arms, each of the bent flanges being welded to the corresponding trailing arm.

2. A torsion beam suspension according to claim 1, wherein a spindle support hole is formed in the body of each of the spindle support plates by burring, and each of the spindles is press-fitted into a corresponding one of the spindle support holes.

3. A torsion beam suspension according to claim 2, wherein a tip end of each of the spindles inserted into the respective spindle support hole passes through the corresponding trailing arm and projects out of the corresponding trailing arm, the tip end of each of the spindles being welded to the corresponding trailing arm.

4. A torsion beam suspension according to claim 1, wherein said spindle support plates are directly welded to the corresponding left and right trailing arms.

5. A torsion beam suspension according to claim 2, wherein said support hole formed in the body of each of the spindle support plates by burring includes a projecting lip extending inward beyond a body surface of the corresponding spindle support plate in an axial direction of said support hole and engaging against the corresponding spindle.

6. A torsion beam suspension according to claim 1, wherein said bent flanges are formed integrally with the spindle support plates and extend a small distance laterally of the vehicle body.

7. A torsion beam suspension according to claim 1, wherein said bent flanges include a plurality of spaced members extending from edges of the support plates at corners thereof to surround a portion of the respective left and right trailing arm.

* * * * *

UNITED STATES PATENT AND TRADEMARK OFFICE
CERTIFICATE OF CORRECTION

PATENT NO. : 6,935,646 B2
DATED : August 30, 2005
INVENTOR(S) : Mitsuru Inoue and Kiyoshi Horiuchi It is certified that error appears in the above-identified patent and that said Letters Patent is hereby corrected as shown below:

Column 1,
Line 31, change "ii eliminated, a spindle" to -- is eliminated, a spindle --.

Column 2,
Line 57, change "FIG. 1 and alone line" to -- FIG. 1 and along line --.

Column 3,
Line 19, change "cross-sectional which opens" to -- cross-section, which opens --.
Line 34, change "plate member, four bent" to -- plate member. Four bent --.
Line 41, change "are welded W4 to the outer" to -- are welded by welding W4 to the outer --.

Column 4,
Line 9, change "upper clamp 13j'"' to -- upper clamp 13f --.
Line 14, change "a small radius section 14d" to -- a small diameter section 14d --.
Line 24, change "through within and projects" to -- through and projects --.
Line 59, change "burning in the spindle" to -- burring in the spindle --.
Line 61, change "the spindle 14 contributing" to -- the spindle 14, contributing --.

Signed and Sealed this

Fourteenth Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,935,646 B2
DATED : August 30, 2005
INVENTOR(S) : Mitsuru Inoue and Kiyoshi Horiuchi It is certified that error appears in the above-identified patent and that said Letters Patent is hereby corrected as shown below:

Column 1,
Line 31, change "ii eliminated, a spindle" to -- is eliminated, a spindle --.

Column 2,
Line 57, change "FIG. 1 and alone line" to -- FIG. 1 and along line --.

Column 3,
Line 19, change "cross-sectional which opens" to -- cross-section, which opens --.
Line 34, change "plate member, four bent" to -- plate member. Four bent --.
Line 41, change "are welded W4 to the outer" to -- are welded by welding W4 to the outer --.

Column 4,
Line 9, change "upper clamp 13j'''" to -- upper clamp 13f --.
Line 14, change "a small radius section 14d" to -- a small diameter section 14d --.
Line 24, change "through within and projects" to -- through and projects --.
Line 59, change "burning in the spindle" to -- burring in the spindle --.
Line 61, change "the spindle 14 contributing" to -- the spindle 14, contributing --.

Signed and Sealed this

Thirtieth Day of May, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,935,646 B2 | Page 1 of 1 |
| APPLICATION NO. | : 10/313952 | |
| DATED | : December 6, 2002 | |
| INVENTOR(S) | : Mitsuru Inoue and Kiyoshi Horiuchi | |

It is certified that error appears in the above-identified patent and that said Letters Patent is hereby corrected as shown below:

Column 5
Line 31 change "the trauma arms," to -- the trailing arms,--

Signed and Sealed this

Twenty-fourth Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 6,935,646 B2  
APPLICATION NO. : 10/313952  
DATED : August 30, 2005  
INVENTOR(S) : Mitsuru Inoue and Kiyoshi Horiuchi It is certified that error appears in the above-identified patent and that said Letters Patent is hereby corrected as shown below:

Column 5  
Line 31 change "the trauma arms," to -- the trailing arms,--

This certificate supersedes Certificate of Correction issued July 24, 2007.

Signed and Sealed this

Fourteenth Day of August, 2007

JON W. DUDAS  
*Director of the United States Patent and Trademark Office*

UNITED STATES PATENT AND TRADEMARK OFFICE
CERTIFICATE OF CORRECTION

PATENT NO. : 6,935,646 B2
APPLICATION NO. : 10/313952
DATED : August 30, 2005
INVENTOR(S) : Inoue et al.

It is certified that error appears in the above-identified patent and that said Letters Patent is hereby corrected as shown below:

Title page:
        In section (57), the ABSTRACT, 6th-7th lines, change "end of trailing arm" to --end of the trailing arm--;
        9th line, change "supports spindle" to --supports the spindle--.

Column 1:
        Line 31, change "bracket ii eliminated" to --bracket is eliminated--.

Column 2:
        Line 5, change "suspension com-" --suspension is provided com- --.
        Line 57, change "and alone line" to --and along line--.

Column 3:
        Line 4, change "that of left half" to --that of the left half--.
        Line 9, change "right trailing aims" to --right trailing arms--.
        Line 11, change "is vertically pivolably" to --is vertically pivotably--.
        Lines 17-18, change "has washer 15 which support the" to --has washer 15 which supports the--.
        Line 20, change "sectional which opens" to --section, which opens--.
        Line 34, change "plate member, four" to --plate member. Four--.
        Line 41, change "welded w4" to --welded by welding w4--.

Column 4:
        Line 9, change "upper clamp 13*j*" to --upper clamp 13*f*--.
        Line 14, change "small radius section" to --small diameter section--.
        Line 24, change "through within and" to --through and--.
        Line 59, change "burning in the spindle" to --burring in the spindle--.
        Line 61, change "spindle 14 contributing" to --spindle 14, contributing--.

UNITED STATES PATENT AND TRADEMARK OFFICE
CERTIFICATE OF CORRECTION

PATENT NO. : 6,935,646 B2
APPLICATION NO. : 10/313952
DATED : August 30, 2005
INVENTOR(S) : Inoue et al.

It is certified that error appears in the above-identified patent and that said Letters Patent is hereby corrected as shown below:

Column 5:
Line 15, change "and the number other than four" to --and a number other than four--.
Line 30, change "the trauma arms" to --the trailing arms--.
Line 32, change "support plates to" to --support plates so as to--.

Column 6:
Lines 32-33, change "respective left and right trailing arm." to --respective left and right trailing arms.--.

This certificate supersedes all previously issued Certificate of Corrections.

Signed and Sealed this

Twenty-fourth Day of February, 2009

JOHN DOLL
*Acting Director of the United States Patent and Trademark Office*